July 7, 1953 J. B. GEHMAN 2,644,893

SEMICONDUCTOR PULSE MEMORY CIRCUITS

Filed June 2, 1952

INVENTOR
John B. Gehman
BY H. L. Meuston
ATTORNEY

UNITED STATES PATENT OFFICE 2,644,893

SEMICONDUCTOR PULSE MEMORY CIRCUITS

John B. Gehman, Haddonfield, N. J., assignor to Radio Corporation of America, a corporation of Delaware Application June 2, 1952, Serial No. 291,177

11 Claims. (Cl. 307—88)

This invention relates generally to memory circuits, and particularly relates to a system utilizing a current multiplication transistor for storing an electrical pulse and determining within a predetermined interval of time whether a pulse has previously been stored or not.

Memory circuits find wide application, for example, in many types of electronic computers. For example, some computers require means for storing information which will later be referred to by the computer to complete a calculation. In some types of computers, a memory is provided by means of a magnetic tape which stores the desired information. Frequently, it is necessary to obtain a plurality of pulses simultaneously from the magnetic tape, each pulse representing information. These pulses are fed simultaneously into the computer. However, the magnetic tape may become mechanically stretched or askew or it may not be feasible to reproduce or to pick up all the pulses simultaneously from the magnetic tape. In that case, an additional memory circuit may be required into which the various pulses derived from the tape are fed in succession for temporary storage and from which they may be derived at will simultaneously.

It is an object of the present invention to provide pulse memory circuits utilizing transistors, whereby difficulties inherent in the system above referred to may be avoided.

Another object of the invention is to provide a pulse responsive transistor circuit which will indicate whether or not a pulse has previously been applied to the circuit within a predetermined interval of time.

A further object of the invention is to provide an improved memory circuit including a current multiplication transistor which will develop an output pulse of predetermined fixed amplitude in response to an interrogating pulse when an input pulse has previously been applied within a predetermined interval of time to the circuit regardless of variations of the amplitude of the input pulse.

A pulse memory circuit, in accordance with the present invention, comprises a current multiplication transistor, that is, a transistor having a ratio of short-circuit collector current increments to emitter current increments which is greater than unity. An impedance element is provided which effectively couples the emitter and collector electrodes. If such a circuit is energized in a conventional manner, a bistable or flip-flop circuit will result. Such bistable circuits have been disclosed and claimed in the patent to Eberhard 2,533,001. The impedance element which couples the emitter and collector may either be provided between the base and ground or it may connect directly the emitter to the collector.

In accordance with the present invention, it is not necessary to apply any bias potentials to the transistor. Instead, input pulses are applied between emitter and base which have such a polarity as to bias emitter and base momentarily in the forward direction. If we assume that the semi-conducting body or crystal of the transistor is of the N type, the input pulse is of positive polarity and will inject holes into the crystal through the emitter. Of course, if the transistor should include a crystal of the P type, the input pulses applied to the emitter are of negative polarity and will inject electrons into the crystal.

Further in accordance with the present invention, interrogating pulses are impressed between collector and base. These interrogating pulses have a polarity so as to bias collector and base momentarily in the reverse direction. Consequently, an output pulse is developed across a load impedance element connected in circuit with the collector in response to an interrogatig pulse provided an input pulse has previously been applied between emitter and base. In other words, the input pulse injects, for example, holes into the crystal which will exist for a predetermined interval of time, that is, until they have either dissipated or dispersed too far from the emitter or until they have recombined with electrons. During this period of time the transistor is brought into a regenerative state. If the interrogating pulse is impressed during this interval of time, a comparatively large output pulse is developed across the collector load impedance element. However, if an interrogating pulse is impressed more than the predetermined interval of time after the last input pulse was impressed, then the transistor will not be in the regenerative state and an output pulse of fairly small amplitude only is obtained from the collector load impedance element.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
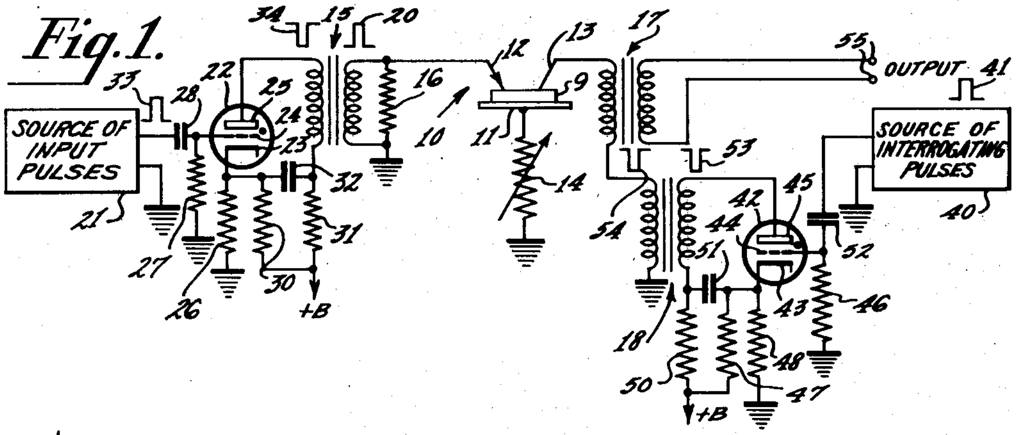
Figure 1 is a circuit diagram of a pulse memory circuit embodying the present invention.

Referring now to the drawing in which like elements are designated by the same reference characters throughout the figures and particularly to Figure 1 there is illustrated a pulse memory circuit comprising a transistor 10 indicated schematically. The transistor 10 includes a semi-conducting body 9, a base electrode 11, an emitter electrode 12 and a collector electrode 13 in contact with the semi-conducting body or crystal 9. The transistor 10 may be of the point contact type, that is, emitter 12 and collector 13 may be in rectifying contact with the crystal. However, in any case, the transistor 10 should be a current multiplication transistor where the collector current increments are larger than the corresponding emitter current increments.

An external network interconnects the electrodes 11—13 of the transistor with a common junction point such as ground. Thus, the base 11 may be grounded through base resistor 14 which may be adjustable as shown. Emitter 12 is grounded through the secondary winding of input transformer 15 and the secondary winding may be bypassed to ground by resistor 16. Collector 13 may be grounded through the primary winding of output transformer 17 and through the primary winding of another transformer 18 connected in series by means of which interrogating pulses are applied to the transistor as will be explained hereinafter.

It will be noted that no sources of direct current voltages are shown nor are any required for the memory circuit of the invention. It will also be noted that no capacitors are provided for storing any direct current voltages. If the transistor network described so far were operated in the conventional manner by applying a forward bias voltage to the emitter 12 and a reverse bias voltage to the collector 13 with respect to the base 11, a regenerative amplifier or bistable circuit would be obtained. Such a circuit has been disclosed in Figure 3 of the Eberhard patent previously referred to.

In accordance with the present invention, input pulses indicated at 20 are impressed between emitter 12 and base 11. These input pulses are of positive polarity so as to bias the emitter 12 and the base 11 in the forward direction provided the crystal is of the N type as indicated by the transistor symbol. The arrow representing emitter 12 points toward crystal 9 to indicate that holes are injected into an N type crystal; if the arrow representing the emitter points away from the crystal, a P type crystal is indicated and the holes will move from the crystal to the emitter. If the semi-conducting crystal were of the P type, the polarity of the input pulse 20 should be reversed.

The input pulse may, for example, be obtained from a source 21 of input pulses which is coupled to a thyratron 22. The thyratron 22 has a cathode 23, a control grid 24 and an anode 25. The cathode 23 is grounded through cathode resistor 26 while the control grid 24 is grounded through grid leak resistor 27. The control grid 24 is also coupled to source 21 through coupling capacitor 28. Preferably, the cathode 23 is positively biased through resistor 30 having one terminal connected to a suitable positive voltage supply indicated at +B while the other terminal is connected to the cathode 23. Hence, the resistors 30 and 26 form a voltage divider which will maintain the cathode 23 at a positive voltage so as to provide the necessary grid bias. The anode 25 is also connected to +B through resistor 31 and the primary winding of input transformer 15 connected in series. The upper terminals of resistors 30 and 31 are coupled through coupling capacitor 32.

Accordingly, when a positive pulse indicated at 33 is developed by source 21 and applied to the control grid 24 of thyratron 22, the thyratron will be triggered to conduct space current. Hence, a negative pulse 34 is developed across the primary winding of input transformer 15. The transformer 15 is wound in such a manner that a positive pulse indicated at 20 appears across the secondary winding of the transformer which is impressed on emitter 12.

As explained previously, this positive pulse applied to emitter 12 will inject holes into the crystal. The holes create a space charge in the immediate vicinity of the emitter and consequently, the injected holes tend to migrate away from the emitter. Depending upon the life time of the holes and the geometry of the transistor, these holes will exist for a certain interval of time. After that interval of time, the holes either recombine with electrons in the crystal or they disperse to such an extent that they are not available any more for the conduction of current. In a commercial transistor this interval of time may be of the order of 15 microseconds, but it is to be understood that time may be greater or smaller depending upon the design of the transistor and the particular crystal that is used.

Further in accordance with the present invention, the transistor memory circuit may be interrogated by means of interrogating pulses which may be obtained from the source 40, which may, for example, develop positive pulses 41. These pulses are again impressed on another thyratron 42 having a cathode 43, a control grid 44 and an anode 45. Thyratron 42 may be connected in the same manner as is thyratron 22 so that the control grid 44 is grounded through grid leak resistor 46. Resistors 47 and 48 again form a voltage divider, the resistor 47 being connected to +B, the junction point between resistors 47, 48 being connected to the cathode 43 while the other terminal of resistor 48 is grounded. Hence, the cathode 43 is maintained at a positive potential with respect to the control grid 44. Anode 45 is connected to +B through resistor 50 and the secondary winding of the transformer 18. Coupling capacitor 51 couples the upper terminals of resistors 47 and 50.

Consequently, the positive interrogating pulse 41 which is impressed through coupling capacitor 52 on the control grid 44 of thyratron 42 will cause the thyratron to conduct space current. A negative pulse 53 is developed in response to the positive pulse 41 across the secondary winding of the transformer 18. The transformer 18 is wound in such a manner that a negative pulse 54 is developed across the primary winding of transformer 18 when a negative pulse 53 is developed across its secondary winding.

Therefore, the negative pulse 54 is impressed through the primary winding of transformer 17 on the collector 13. When this negative interrogating pulse occurs within the predetermined time interval after the occurrence of the positive input pulse 20, a comparatively large output pulse is developed across the output transformer 17. On the other hand, if the interrogating pulse 54 occurs outside of the predetermined time interval within which the previously injected holes are effective, a comparatively small output pulse is developed across the output transformer 17.

Figure 2:
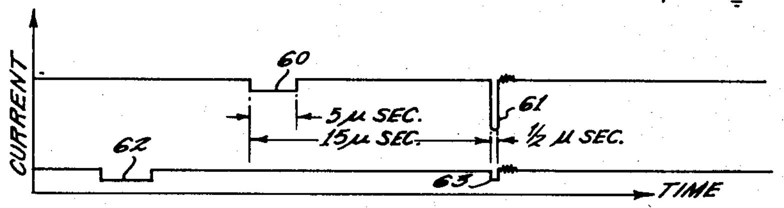
Figure 2 is a graph illustrating the output current as a function of time obtained under different conditions from the memory circuit of Figure 1.

This has been illustrated in Figure 2 to which reference is now made. The pulse 60 shown in Figure 2 indicates the output current which flows through the primary winding of output transformer 17 in response to an input pulse 20 being impressed on the emitter. As shown in Figure 2, the pulse 60 may, for example, have a duration of 5 microseconds. By way of example, the predetermined time interval within which the transistor remains in its regenerative state has been indicated to be 15 microseconds. Hence, if the interrogating pulse 54 occurs within those 15 microseconds from the occurrence of the input pulse, a comparatively large output pulse indicated at 61 is obtained from the output terminals 55 which are connected across the secondary winding of the transformer 17.

However, if an input pulse causing a collector pulse indicated at 62 occurs more than 15 microseconds before the interrogating pulse is applied, then a comparatively small output pulse 63 is obtained, because, in that case, the transistor is no longer in its regenerative state.

Thus, the application of the input pulses will carry the transistor into a regenerative state where it is capable of providing a large collector current in response to an interrogating pulse for a predetermined interval of time. During this interval of time the transistor is conditioned to develop a comparatively large output pulse such as shown at 61 in response to an interrogating pulse 54. If on the other hand, the interrogating pulse 54 occurs outside of the predetermined interval of time after the occurrence of the input pulse, then only a small output pulse is obtained.

The pulse memory circuit of the invention accordingly is able to determine whether or not an input pulse has previously been applied thereto within a predetermined interval of time.

It is to be understood, however, that it is also feasible to apply bias voltages to either the collector or to the emitter or to both in the conventional manner. These bias voltages however, should be so small that the transistor normally is not in the regenerative state, but can only be brought into its regenerative state by the application of an input pulse. The magnitude of the voltages which may be applied will depend upon the individual transistor and on the resistance of the base resistor 14 which has been shown to be adjustable. The resistance of the base resistor 14 should be adjusted so that the input pulse will bring the transistor into its regenerative state and so that the transistor will remain in the regenerative state for the predetermined interval of time. Care should be taken by adjusting the bias voltages if any are applied and by adjusting the resistance of base resistor 14 so that the transistor will not be in the regenerative state in the absence of an input pulse or after the predetermined time interval has elapsed.

Figure 3:
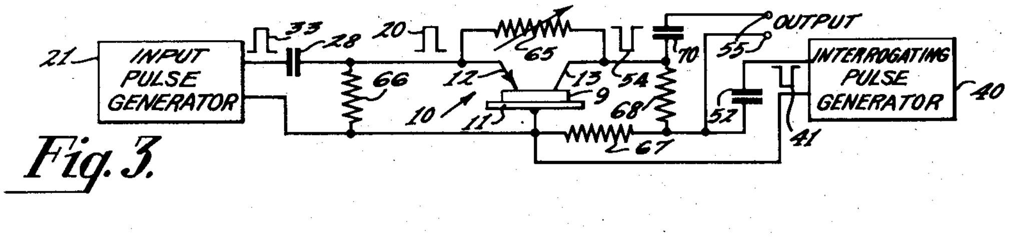
Figure 3 is a circuit diagram of a modified pulse memory circuit in accordance with the invention.

As illustrated in Figure 1 of the Eberhard patent above referred to, it is also feasible to obtain a bistable transistor circuit or regenerative amplifier by connecting a resistor directly between emitter and collector. Such a regenerative transistor amplifier circuit may be utilized in the pulse memory circuit of the invention as shown in Figure 3. A resistor 65 which may be adjustable as shown is connected directly between emitter 12 and collector 13. The input pulse generator 21 has one terminal coupled to collector 12 through coupling capacitor 28 and the input pulse 20 of positive polarity is developed across resistor 66 connected between emitter 12 and base 11. The interrogating pulse generator 40 is coupled through coupling capacitor 52 across a resistor 67 which is connected in series with resistor 68 between base 11 and collector 13.

Hence, if the pulse generator 40 develops a negative output pulse 41, a negative interrogating pulse 54 is applied between base 11 and collector 13. The output pulse is developed across output resistor 68 and may again be obtained from output terminals 55, one of which is coupled to collector 13 through coupling capacitor 70.

The circuit of Figure 3 operates essentially in the same manner as that of Figure 1. The positive input pulse 20 will again bring the transistor into its regenerative state as previously explained. The negative interrogating pulse 54 will then determine whether or not an input pulse has previously been applied within the predetermined time interval. If the transistor was previously conditioned to be in its regenerative state, a large output pulse will be obtained from output terminals 55 and if no input pulse was applied within the predetermined time interval, a comparatively small output pulse is obtained from the output terminals 55.

In the circuit of Figure 3 the resistance of resistors 66, 67 and 68 should be comparatively low so that the transistor may be brought into its regenerative state by means of an input pulse.

Figure 4:
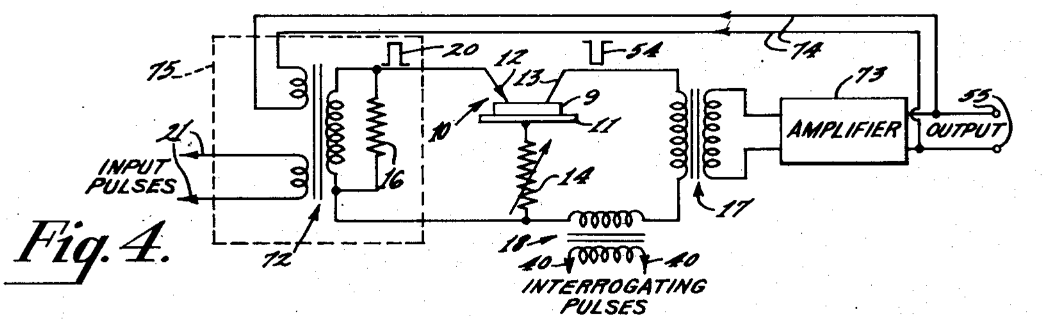
Figure 4 is a circuit diagram of a pulse memory circuit in accordance with the invention where interrogating pulses are periodically applied to extend the memory of the circuit.

Since the pulse memory circuit of the present invention has a comparatively short memory, it may be desirable to extend the memory for a longer period of time. This may be effected as illustrated in Figure 4 by periodically applying interrogating pulses between collector and base and simultaneously applying a suitable pulse to the emitter. In this manner it is feasible to maintain the transistor in its regenerative state for any length of time.

The input pulses 20 may be applied to terminals 21 through a transformer 72 having a primary winding connected to the input terminals 21 while the secondary winding is connected effectively between emitter 12 and base 11. A base resistor 14 is again provided as in the circuit of Figure 1. The interrogating pulses are applied to input terminals 40 and are impressed through transformer 18 between collector 13 and base 11. The output pulses are again developed across the output transformer 17.

However, in the circuit of Figure 4 an amplifier 73 is provided between the output transformer 17 and the output terminals 55. By means of leads 74, the output terminals of the amplifier 73 are connected to a tertiary winding of transformer 72 which is shown within dotted rectangle 75.

When an input pulse is applied to input terminals 21, a positive pulse 20 is impressed between emitter 12 and base 11 which will bring the transistor into its regenerative state as previously described. When an interrogating pulse is applied to terminals 40 within the predetermined interval of time after the occurrence of the input pulse, a comparatively large output pulse is developed across output transformer 17. This output pulse is amplified by amplifier 73 and may be obtained from output terminals 55. At the same time, the output pulse is impressed through lead 74 on the tertiary winding of transformer 72 thereby to develop another input pulse 20 which is impressed again between emitter 12 and base 11. The amplifier 73 should be designed in such a manner that a positive input pulse 20 is applied through the transformer 72 to the emitter 12 in response to a negative output pulse 54.

Accordingly, when the interrogating pulses 40 are reapplied periodically within less than the predetermined time interval within which the transistor remains regenerative it is possible to extend the memory of the circuit. In other words, the input pulse 20, if once applied through input terminals 21, may be periodically reapplied by means of the interrogating pulses impressed on the terminals 40. Therefore, the memory of the original input pulse may be maintained for any desired length of time.

If no input pulse is applied to the memory circuit of Figure 4 within the predetermined interval of time before the application of an interrogating pulse, then the output pulse developed across transformer 17 in response to the interrogating pulse is so small that any pulse which may be reapplied through leads 74 to the emitter 12 is of such a small amplitude that it will not carry the transistor into its regenerative state. In other words, the applied interrogating pulses will not be able to maintain or to carry the transistor in its regenerative state unless an input pulse has first been applied within the predetermined period of time before the application of the first interrogating pulse.

Figure 5:
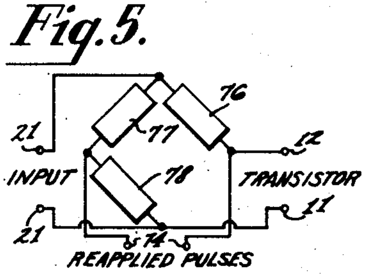
Figures 5 and 6 are circuit diagrams of a bridge network and of a hybrid transformer respectively which may be substituted for the input transformer of the circuit of Figure 4.
Figure 6:
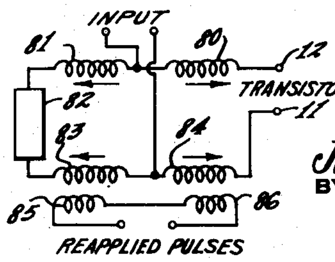

The transformer 72 as shown in dotted rectangle 75 may be replaced either by the bridge network of Figure 5 or by the hybrid transformer of Figure 6. Either the bridge network of Figure 5 or the hybrid transformer of Figure 6 will prevent that an input pulse applied to input terminals 21 appears in the tertiary winding of the transformer 72 or in the leads 74. In other words, the circuits of Figures 5 and 6 will prevent that feed through signals are developed either at the output terminals 55 or at the input terminals 21 causing a response in either circuit. The bridge network of Figure 5 includes three impedance elements schematically indicated at 76, 77 and 78 forming three arms of the bridge, the fourth arm of which is formed by the transistor, that is, by the impedance which appears between the emitter 12 and the base 11. The input signal is applied to input terminals 21 which are connected to the junction of impedance elements 77 and 76 on the one hand and to the junction between impedance element 78 and base 11 on the other hand. The reapplied pulses are impressed on lead 74 which are connected to the two other junction points of the bridge network, that is, to the junction between impedance elements 77, 78 on the one hand and between impedance element 76 and emitter 12 on the other hand. The impedance elements 76, 77 and 78 should be chosen so as to balance the bridge and in particular to match the impedance of the transitor, that is, the impedance between emitter 12 and base 11.

Alternatively, the hybrid transformer of Figure 6 may be substituted for the dotted rectangle 75 in Figure 4. The hybrid transformer includes a pair of windings 80, 81, an impedance element 82 and another pair of windings 83 and 84 connected in series between emitter 12 and base 11. The input pulses are applied to the junction between windings 80, 81 and between windings 83, 84. The reapplied pulse obtained from leads 74 are applied to another pair of windings 85, 86 inductively coupled respectively to the windings 83, 84. The impedance 82 again must match the impedance of the transistor as seen between emitter 12 and base 11.

Either the bridge network of Figure 5 or the hybrid transformer of Figure 6 will prevent the occurrence of any output pulse at leads or terminals 74 in response to an input pulse applied to the terminals 21.

There have thus been disclosed pulse memory circuits which include or utilize a current multiplication transistor. The transistor may be operated without applying any direct current voltages. The circuit is able to determine whether or not an input pulse has previously been impressed thereon within a predetermined interval of time. It is also feasible to extend the memory of the circuit by reapplying or recirculating a previously applied input pulse by periodically impressing interrogating pulses on the circuit.

What is claimed is:

1. A pulse memory circuit comprising a current multiplication transistor including a semiconducting body, a base electrode, an emitter electrode and a collector electrode in contact with said body, an impedance element effectively coupling said emitter and collector electrodes, means for impressing input pulses between said emitter and base electrodes having a polarity to bias said emitter and base electrodes momentarily in the forward direction, means for impressing interrogating pulses between said collector and base electrodes having a polarity to bias said collector and base electrodes momentarily in the reverse direction, and a load impedance element connected in circuit with said collector electrode, whereby an output pulse of predetermined amplitude is developed across said load impedance element in response to an interrogating pulse which occurs within a predetermined interval of time after the occurrence of one of said input pulses.

2. A pulse memory circuit comprising a current multiplication transistor including a semiconducting body, a base electrode, an emitter electrode and a collector electrode in contact with said body, a resistor effectively coupling said emitter and collector electrodes, means for impressing input pulses between said emitter and base electrodes having a polarity to bias said emitter and base electrodes momentarily in the forward direction, means for impressing interrogating pulses between said collector and base electrodes having a polarity to bias said collector and base electrode momentarily in the reverse direction, and a load impedance element connected in circuit with said collector electrode, said pulses being the only sources of potential of said transistor, whereby an output pulse of predetermined relatively large amplitude is developed across said load impedance element in response to an interrogating pulse which occurs within a predetermined interval of time after the occurrence of one of said input pulses.

3. A pulse memory circuit comprising a current multiplication transistor including a semi-conducting body, a base electrode, an emitter electrode and a collector electrode in contact with said body, a network interconnecting said electrodes for direct currents with a common junction point, said network including a first impedance element effectively coupling said emitter and base electrodes, said network further including a second impedance element in circuit with said collector electrode, means for impressing input pulses between said emitter and base electrodes having a polarity so as to bias said emitter and base electrodes momentarily in the forward direction, means for impressing interrogating pulses between said collector and base electrodes having a polarity so as to bias said collector and base electrodes momentarily in the reverse direction, whereby said input pulses carry said transistor into a regenerative state for a predetermined interval of time, and means for deriving output pulses of predetermined magnitude across said second impedance element in response to an interrogating pulse applied between said collector and base electrodes which occurs within said interval of time after the occurrence of an input pulse.

4. A pulse memory circuit comprising a current multiplication transistor including a semiconducting body, a base electrode, an emitter electrode and a collector electrode in contact with said body, a network interconnecting said electrodes for direct currents with a common junction point, said network including a first impedance element effectively coupling said emitter and base electrodes, said network further including a second load impedance element connected effectively between said collector electrode and said junction point, means for impressing input pulses between said emitter and base electrodes having a polarity so as to bias said emitter and base electrodes momentarily in the forward direction, means for impressing interrogating pulses between said collector and base electrodes having a polarity so as to bias said collector and base electrodes momentarily in the reverse direction, said pulses being the only potentials applied to said electrodes, whereby said input pulses carry said transistor into a regenerative state for a predetermined interval of time, and means for deriving output pulses of predetermined magnitude across said second load impedance element in response to an interrogating pulse applied between said collector and base electrodes which occurs within said interval of time after the occurrence of an input pulse.

5. A pulse memory circuit comprising a current multiplication transistor including a semiconducting body, a base electrode, an emitter electrode and a collector electrode in contact with said body, a network interconnecting said electrodes for direct currents with a common junction point, said network including a resistor effectively coupling said emitter and base electrodes, said network further including a load impedance element connected between said collector electrode and said junction point, means for impressing an input pulse between said emitter and base electrodes, said input pulse having a polarity so as to bias said emitter and base electrodes momentarily in the forward direction, thereby to inject charge carriers into said body and to carry said transistor into its regenerative state for a predetermined interval of time, and means for impressing an interrogating pulse between said collector and base electrodes, said interrogating pulse having a polarity so as to bias said collector and base electrodes momentarily in the reverse direction, said pulses being the sole sources of potential of said transistor, whereby an output pulse of predetermined magnitude is developed across said load impedance element in response to said interrogating pulse being applied to said collector and base electrodes within said interval of time after the occurrence of said input pulse.

6. A pulse memory circuit comprising a current multiplication transistor including a semi-conducting body, a base electrode, an emitter electrode and a collector electrode in contact with said body, a network interconnecting said electrodes with a common junction point and including a first impedance element directly connected between said emitter and collector electrodes, said network further including a second output impedance element connected between said collector electrode and said junction point, means for applying input pulses between said emitter and collector electrodes, said first impedance element being so adjusted and said input pulses being of such a polarity as to carry said transistor into a regenerative state for a predetermined interval of time, and means for impressing an interrogating pulse between said collector and base electrodes, said interrogating pulse having a polarity so as to bias said collector and base electrodes momentarily in the reverse direction, said pulses being the sole sources of potential of said transistor, whereby an output pulse of predetermined magnitude is developed across said second impedance element in response to said interrogating pulse being applied to said collector and base electrodes within said interval of time after the occurrence of said input pulse.

7. A pulse memory circuit as defined in claim 6 wherein said first impedance element is a resistor.

8. A pulse memory circuit comprising a current multiplication transistor including a semi-conducting body, a base electrode, an emitter electrode and a collector electrode in contact with said body, a network interconnecting said electrodes with a common junction point and including a first impedance element connected between said base electrode and said junction point for effectively coupling said emitter and collector electrodes, said network further including a second output impedance element connected between said collector electrode and said junction point, means for applying input pulses between said emitter and collector electrodes, said first impedance element being so adjusted and said input pulses being of such a polarity as to carry said transistor into a regenerative state for a predetermined interval of time, and means for impressing an interrogating pulse between said collector and base electrodes, said interrogating pulse having a polarity so as to bias said collector and base electrodes momentarily in the reverse direction, said pulses being the sole sources of potential of said transistor, whereby an output pulse of predetermined magnitude is developed across said second impedance element in response to said interrogating pulse being applied to said collector and base electrodes within said interval of time after occurrence of said input pulse.

9. A pulse memory circuit as defined in claim 8 wherein said first impedance element is a resistor.

10. A pulse memory circuit comprising a current multiplication transistor including a semiconducting body, a base electrode, an emitter electrode and a collector electrode in contact with said body, a network interconnecting said electrodes for direct currents with a common junction point, said network including a first impedance element effectively coupling said emitter and base electrodes, said network further including a second output impedance element connected between said collector electrode and said junction point, means for impressing an input pulse between said emitter and base electrodes, said input pulse having a polarity so as to bias said emitter and base electrodes momentarily in the forward direction, thereby to inject charge carriers into said body and to carry said transistor into its regenerative state for a predetermined interval of time, means for impressing an interrogating pulse between said collector and base electrodes, said interrogating pulse having a polarity so as to bias said collector and base electrodes momentarily in the reverse direction, said pulses being the sole sources of potential of said transistor, means for deriving an output pulse of predetermined magnitude across said second impedance element in response to said interrogating pulse being applied to said collector and base electrodes within said interval of time after the occurrence of said input pulse, and means for applying said output pulse between said emitter and base electrodes in such a polarity as to bias them momentarily in the forward direction, thereby to carry said transistor again into its regenerative state for said predetermined interval of time.

11. A pulse memory circuit as defined in claim 10 wherein interrogating pulses are applied periodically to said transistor, said interrogating pulses recurring within less than said predetermined interval of time, whereby said transistor is maintained in its regenerative state in response to the application of an input pulse as long as said interrogating pulses are applied and as long as the first one of said interrogating pulses occurs within said interval of time after the occurrence of said input pulse.

JOHN B. GEHMAN.

References Cited in the file of this patent

UNITED STATES PATENTS

| Number | Name | Date |
|---|---|---|
| 2,569,345 | Shea | Sept. 25, 1951 |
| 2,591,961 | Moore | Apr. 8, 1952 |
| 2,594,449 | Kircher | Apr. 29, 1952 |
| 2,620,448 | Wallace | Dec. 2, 1952 |
| 2,622,211 | Trent | Dec. 16, 1952 |
| 2,623,170 | Dickinson | Dec. 23, 1952 |
| 2,627,039 | MacWilliams | Jan. 27, 1953 |

OTHER REFERENCES

"The Transistor." Bell Telephone Labs., pp. 627–686.

"Computers Using Transistors." By J. H. Felker.

Electrical Engr., pp. 1103–1108. December 1952.